(12) United States Patent
Ahn

(10) Patent No.: US 6,237,869 B1
(45) Date of Patent: May 29, 2001

(54) SKID MECHANISM OF SAFETY SEAT BELT RETRACTOR

(75) Inventor: Hee-Don Ahn, Gangwon-do (KR)

(73) Assignee: Delphi Automotive Systems Sungwoo Corporation, Seoul (KR)

( * ) Notice: Subject to any disclaimer, the term of this patent is extended or adjusted under 35 U.S.C. 154(b) by 0 days.

(21) Appl. No.: 09/362,694

(22) Filed: Jul. 29, 1999

(30) Foreign Application Priority Data

Jun. 18, 1999 (KR) .................................................. 99-23035

(51) Int. Cl.$^7$ .................................................. B60R 22/28
(52) U.S. Cl. .......................................................... 242/379.1
(58) Field of Search ........................ 242/379.1; 280/805; 297/478, 470, 471, 472

(56) References Cited

U.S. PATENT DOCUMENTS

| | | |
|---|---|---|
| 3,970,265 | 7/1976 | Köpke et al. . |
| 4,322,046 | 3/1982 | Tanaka et al. . |
| 5,687,926 | 11/1997 | Park et al. .......................... 242/383.4 |
| 5,794,877 | * 8/1998 | Ono et al. .......................... 242/379.1 |
| 5,954,287 | * 9/1999 | Hirase ................................ 242/379.1 |
| 5,967,441 | * 10/1999 | Kohlndorfer et al. ............. 242/379.1 |
| 6,105,894 | 8/2000 | Singer et al. ...................... 242/379.1 |

FOREIGN PATENT DOCUMENTS

WO 96/03230    2/1996    (WO) .

* cited by examiner

Primary Examiner—John M. Jillions
(74) Attorney, Agent, or Firm—Nath & Associates PLLC; Harold L. Novick

(57) ABSTRACT

A safety belt retractor comprises a belt winding shaft including a cylindrical projecting portion projected from its one end surface, a torsion bar coupled at one end to the end surface of the belt winding shaft and at the other end to a skid mechanism integrated with a sprocket, which is accommodated in the belt winding shaft and the skid mechanism for limiting the torque of the torsion bar, in which the cylindrical projecting portion includes a stopper for determining the rotation of the torsion bar, the skid mechanism includes a skip member, which is provided with a latching portion contacting with the stopper and a skid element for limiting the torque of the torsion bar, and a skid structure provided with a boss coupled to enable the other end of the torsion bar to be inserted thereinto and a guide groove formed around the periphery of the boss on the bottom surface thereof, in which at least two pairs of blocking elements are provided, thereby to limit the rotation of the belt winding shaft.

5 Claims, 4 Drawing Sheets

SKID MECHANISM OF SAFETY SEAT BELT RETRACTOR

BACKGROUND OF THE INVENTION

The invention is related to providing a safety seat belt retractor including a self-locking belt shaft for winding a web, and particularly, to providing a skid mechanism mounted on a web winding shaft for limiting the torque of a torsion bar in multi-stages to smoothly control the tension of a belted occupant.

In general, a seat belt retractor is provided with a belt winding shaft or reel of which a seat belt or web is wound around, in which the belt winding shaft includes a torsion bar that is connected at one end thereto and at the other end to a blocking member of the retractor. Therefore, the seat belt retractor comprising the torsion bar is rotated at one end and locked at the other end in an emergency situation to force it to be twisted, thereby absorbing the impact energy of the occupant. Particularly, when the torsion bar is used in connection with an air bag, the response of the torsion bar allows for an additional, but decelerated forward displacement of the belted occupant. In other words, as the belt unwinds from the belt shaft in an emergency situation, the belt loading of the belt shaft blocked by the blocking member is reduced by the torsion bar which yields and allows for further rotation of the belt shaft.

However, the average seat belt retractor has disadvantages in that the torsion bar may be excessively twisted and broken due to the higher withdrawal force of the seat belt in an emergency situation when a vehicle collides with another vehicle or the weight of the belted occupant is too great Also, the acting force applied to the belt shaft is increased by the torsion bar as a result of the cold deformation of the material and the decreasing winding diameter. In other words, as a result of the associated lever arm reduction, the associated force-path characteristic curve is progressive.

In order to resolve this problem, there are two typical patents that have been registered U.S. Pat. No. 4,322,046 and the other is International Publication No. WO96/32303.

The former patent discloses a seat belt retractor comprising a reel, a torsion bar, one end of which is connected to a reel and is rotated therewith and the other end of which is locked during an emergency, and a stopper including a screw member which moves together with the reel when the reel rotates the torsion bar while twisting due to the tensional force of the seat belt and which is stopped after moving at a predetermined distance to prevent the reel from rotating. The torsion bar includes a bar-shaped twisting portion accommodated within the reel with one end being connected to the reel, a screw portion provided with a screw in the outer periphery thereof, which is formed at the other end of the twisting portion and has a larger diameter than that of the twisting portion, and a gear portion mounted on the screw portion so as to enable the screw motion therewith towards the stopping member with the reel, in which the twisting portion is integrally connected to the screw portion and the gear portion. Therefore, the torsion bar is not broken even by the greater tensional force of the seat belt.

But, the patent fails to adjust the torque of the torsion bar due to the sudden withdrawal of the seat belt upon the emergency coupling of a vehicle sensor such as a pendulum with the gear portion. It means that the screw of the screw portion is distorted under the influence of the twisting portion, thereby making it difficult to move the screw member on the screw. Further, the performance of relieving the restraining force of an occupant due to the belt withdrawal stopping state in an emergency deteriorates.

The latter patent provides a belt roller with a damping force limiter for restricted belt withdrawal, when a blocking member is engaged. The damping force limiter comprises a tension rod connected at one end to a belt winding shaft and at the other end to a blocking member of its end, a profile head connected to the associated shaft end face which rotates together with the belt winding shaft and an energy dissipating structure provided in the force transmission path including the torsion rod, the profile head and the shaft.

FIG. 1 is an exploded perspective view of a belt roller provided with a damping force limiter. The belt roller comprises an U-shaped housing 10, in whose U-limbs or the aperture 12 arranged therein a belt winding shaft 13 is mounted. At the blocking end of the belt winding shaft 13, a profile head 14 rotating with the end face of the belt winding shaft 13 is associated with the end face of the belt winding shaft 13. A blocking member 15 is mounted on the profile head 14, which can be radially deflected under the action of a control device and which is controlled so as to be guided into the toothing 30 arranged in the associated aperture in the event of deceleration.

The profile head 14 and the belt winding shaft 13 are connected to one another by a torsion rod 16 acting as a force limiting device, the connection being formed in that one end of the torsion rod 16 is connected preferably in a positive-locking manner to the profile head 14, and the other end of the torsion rod 16 extending in the belt winding shaft 13 is connected to the belt winding shaft 13 in a manner not shown. If, after the blocking of the profile head 14 by means of the blocking member 15, there is a further belt extraction with a corresponding rotation of the belt winding shaft 13, then this rotational movement is transmitted via the torsion rod 16 with a simultaneous absorption of energy to the profile head, either an abutment being provided between the belt winding shaft 13 and the profile head 14 to limit the deformation of the torsion rod 16 or the torsion rod being constructed in such a manner that it can carry out a larger number of rotations than is required for the energy conversion. In order to provide the additional, energy-dissipating structure in the transmitting path, at least one shearing element 25 or 31 is provided at the end face of the belt wind shaft 13 facing the profile head 14, which shearing element engages in an associated bore 26 in the profile head 14. By means of the cross-sectional surface area of the shearing element and its distance from the pivot axis of the belt winding shaft 13 or profile head 14, it is possible to adjust the torque and path in such a manner that the shearing element shears off and thus the sole loading of the torsion rod 16 is effected. After the shearing off of the shearing element, the torque is exclusively transmitted by the torsion rod 16.

But, the patent also fails to adjust the torque of the torsion rod after the shearing off of the shearing element due to the excessive drawing force of a web in the event of loading. The reason is because the shearing off of the shearing element means that the torsion rod 16 rotates only one time for the adjustment of the torque. Due to further rotation of the torsion rod beyond the inheritance stress limit, the torsion rod may cause its breaking. And also, the effect of the damping force gets lost, thereby resulting in an occupant being under the undesirable strong tension influence of the web during an emergency, because the profile head cannot be rotated in itself to the initial position upon the returning of the torsion rod to the original state due to the removal of the web loading.

Therefore, it is very desirable that the torque of a torsion bar be smoothly adjusted or controlled under the condition that the torsion bar is not broken. Also, it is further preferable to control the torque of the torsion bar in multi-stages.

One object of the invention is to provide a skid mechanism of a safety belt retractor for limiting the torque of a torsion bar to smoothly control the tension of a belted occupant.

Another object of the invention is to provide a skid mechanism of a safety belt retractor for limiting the torque of a torsion bar in multi-stages to increase the limiting quantity of the damping force.

Still another object of the invention is to provide a skid mechanism of a safety belt retractor for enabling it to return to its original position upon relieving the twisting of the torsion bar.

SUMMARY OF THE INVENTION

According to the invention, a safety belt retractor comprises a belt winding shaft including a cylindrical projecting portion projected from its one end surface, a torsion bar coupled at one end with the end surface of the belt winding shaft and at the other end to a skid mechanism integrated with a sprocket, which is accommodated in the belt winding shaft and the skid mechanism for limiting the torque of the torsion bar, in which the cylindrical projecting portion includes a stopper for determining the rotation of the torsion bar, the skid mechanism includes a skip member, which is provided with a latching portion contacting with the stopper and a skid element for limiting the torque of the torsion bar, and a skid structure provided with a boss coupled to enable the other end of the torsion bar to be inserted thereinto and a guide groove formed around the periphery of the boss in the bottom surface thereof The skid structure includes at least two torque damping elements provided in at least two positions of the guide groove thereof.

BRIEF DESCRIPTION OF THE DRAWINGS

The invention now will be described in detail with reference to the accompanying drawings, in which.

DETAILED DESCRIPTION OF THE INVENTION

Figure 1:
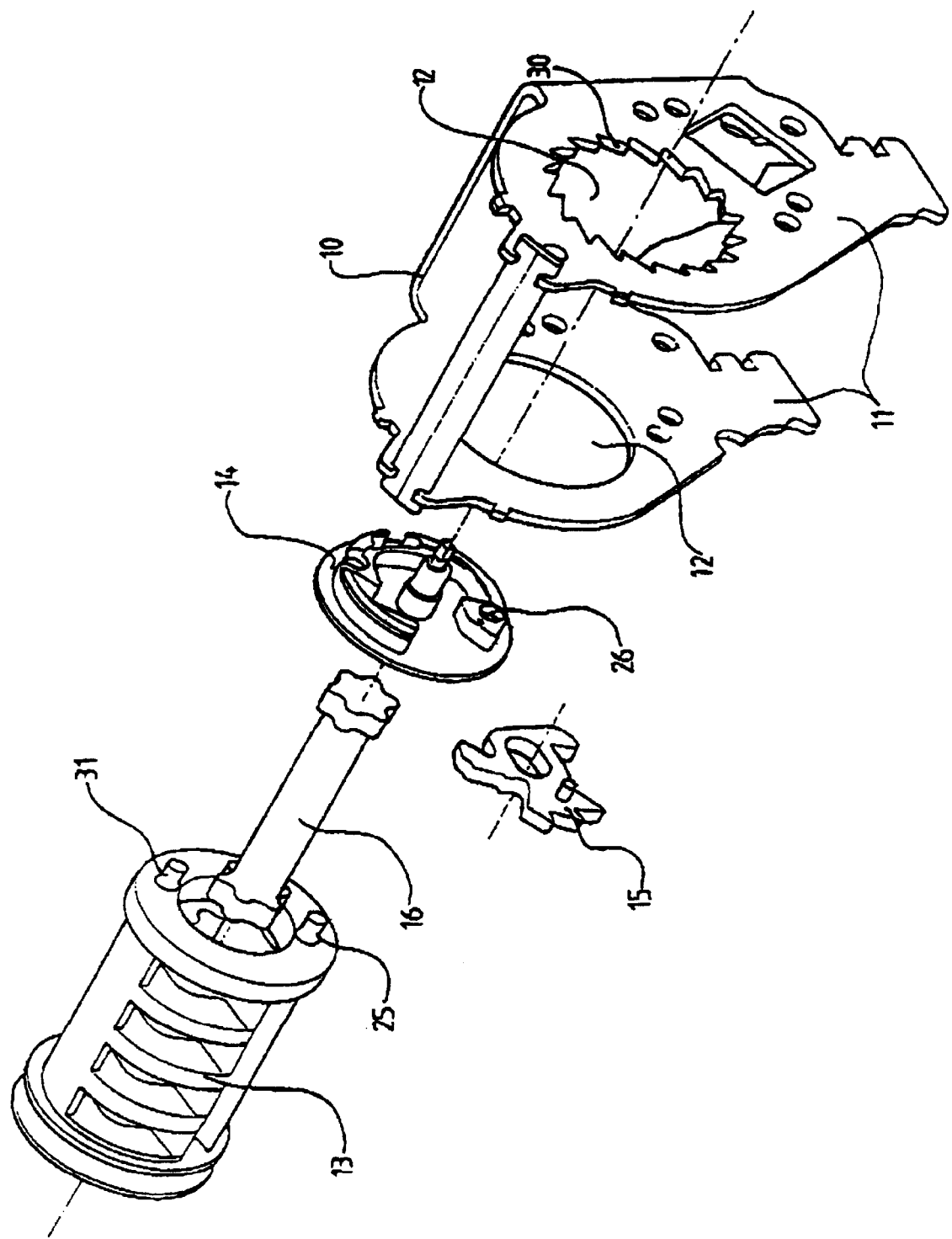
FIG. 1 is an exploded perspective view illustrating a belt roller provided with a damping force limiter according to a prior art.
Figure 2:
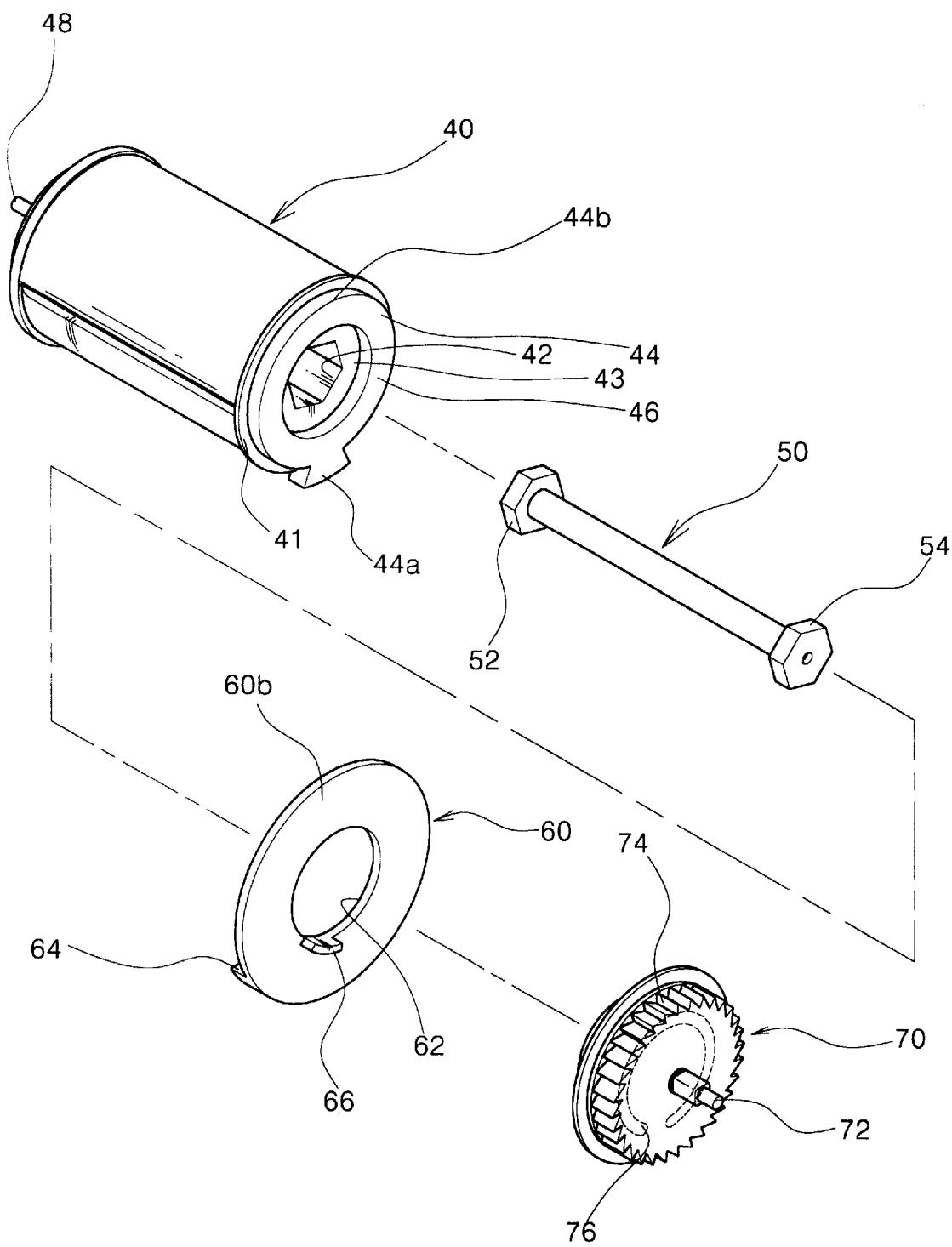
FIG. 2 is an exploded perspective view illustrating a skid mechanism of a safety belt retractor according to the invention.
Figure 3:
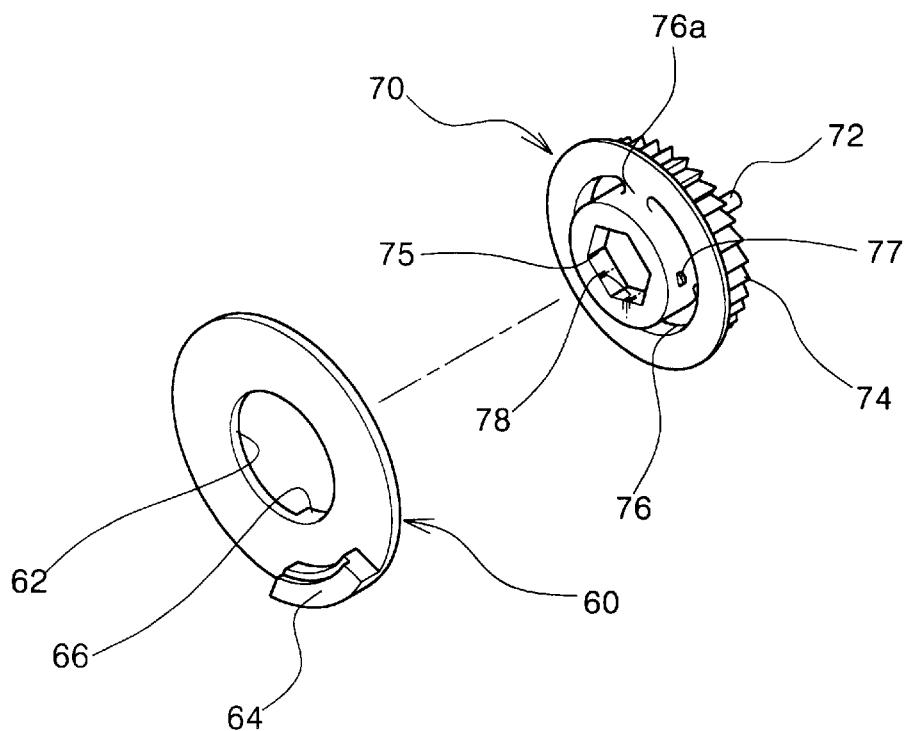
FIG. 3 is a perspective view illustrating the skid mechanism in which a skid member and a skid structure are coupled with each other.

Referring to FIGS. 2 to 4, a preferable embodiment of the invention will be explained in detail as below, showing how to couple a skid mechanism according to the invention with any safety seat belt retractor, effectively.

According to the preferable embodiment, a skid mechanism is designed to assure the restraining against the web withdrawal force of an occupant at the time of an abrupt situation such as when a car accident occurs, which is coupled to a safety seat belt, effectively, in a manner that any vehicle sensor can cooperate with the sprocket assembly not shown.

FIG. 2 shows a schematic structure of a safety belt retractor except for an U-shaped housing including at least two frames mounted for rotatably supporting a belt reel or a belt winding shaft 40. The belt winding shaft 40 is moulded into one body, one end of which is sealed and associated with another means such as a web tension reducer not shown and the other end of which is coupled with a sprocket assembly subject to being cooperated with a vehicle sensor and another assembly supposed to be related to a web sensor, which are not illustrated due to their well-known structure.

The safety belt retractor comprises the belt winding shaft 40 having a cavity forming a receptacle groove 42 to receive a torsion bar 50, the torsion bar 50 inserted into the receptacle groove 42 to be twisted by the outer loading applied through a web thereto when a vehicle emergency occurs, a skid mechanism including a skid member 60 and a skid structure 70 coupled with each other to enable them to control the torque of the torsion bar 50.

The belt winding shaft 40 includes flanges 41 extended from around the circular periphery thereof, which acts as a guide surface for the rotation of a skid member 60 as described below, a coupling portion (not shown) formed on its sealed inner surface to fix one end of the torsion bar 50 thereto and a cylindrical projecting portion 44 projected at a predetermined height from the other surface to communicate with the receptacle groove 42, in which the projecting portion 44 has a diameter smaller than that of the flange 41. The cylindrical projecting portion 44 includes a stopper 44a projected from one side passing through the flange 41 to be flush with the upper surface thereof, the side surface of which forms an outer contacting portion 44b to guide a skid element 64 as described below, and a centre hole 43 formed to be coupled with a boss 75.

The torsion bar 50 includes two coupling elements 52 and 54 at both ends, which are respectively coupled to the coupling portion of the belt winding shaft and the skid structure 70 in the form of a nut type having polygonal surfaces.

The skid mechanism comprises the skid member 60 and the skid structure 70 coupled to each other during assembling. The skid member 60 is in the form of a flat plate having a diameter bigger than that of the flange 41 and including an aperture 62 formed at the same size as the centre hole 43 of the cylindrical projecting portion 44 at the centre. A latching element 64 is integrally formed on a predetermined position of the skid member 60 facing to the cylindrical projecting portion 44. The latching element 64 also includes a step portion that is guided in contact with the side surface of the projecting portion and the upper surface of the flange 41 at the time of being rotated and a latch portion abutted to the stopper 44a to prevent the rotational movement of the skid member 60. A projector 66 is extruded from a portion adjacent to the aperture 62 to restrain the torque of the belt winding shaft 40 associating with blocking elements 77 formed in a guide groove of the skid structure 70 as shown in FIG. 3 while guiding the rotation of the skid member 60 as described below.

Figure 4A:
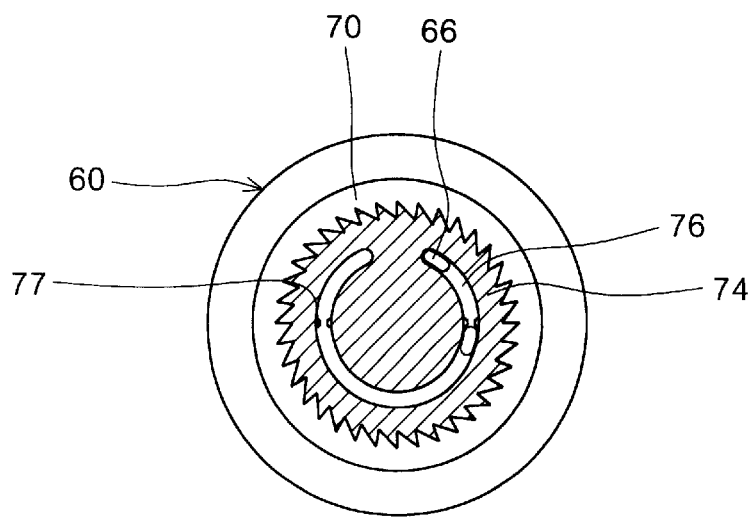
FIGS. 4a and 4b are side cross-sectional views viewed from a sprocket, which illustrate the movement of a projector of the skid member in a guide groove of the skid structure according to the invention.
Figure 4B:
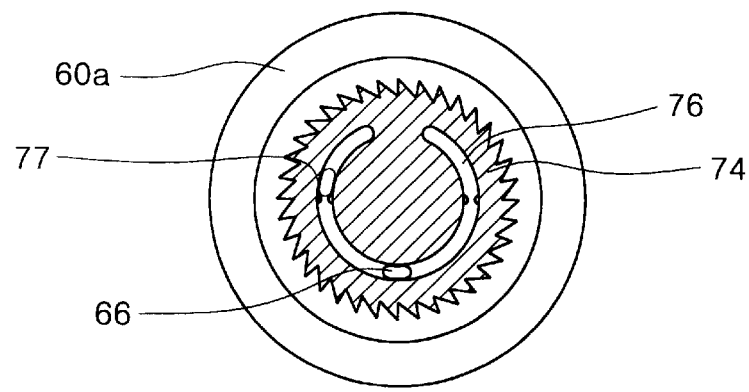

The skid structure 70 is assembled with a sprocket assembly (not shown), but the detailed explanation of the sprocket assembly is omitted. A sprocket 74 is integrally constructed as a part of the skid structure 70 provided with a rotational supporting axis 72 for rotatably supporting the belt winding shaft 40, which is subjected to cooperating with a vehicle sensor. A boss 75 is projected from the sprocket 74 facing to the skid member 60 to be passed into the aperture 62, inserted into the centre hole 43 of the cylindrical projecting portion 44 and coupled to the torsion bar 50. Also, the boss 75 includes a coupling portion 78 formed in the same shape as that of the other end 54 of the torsion bar 50. A guide groove 76 is formed around the outer periphery of the boss 75 to enable the projector 66 to be moved therein, in which an abutment 76a is formed at a predetermined position of the circular guide groove 76 to stop the movement of the skid member 60 to less than one rotation, and at least two blocking elements 77 formed in the guide groove 76 to restrain the rotation of the skid member 60 contacting with the projector 66, in which the blocking elements 77 can be paired and positioned at a diametrical line of the guide groove 76 as shown in FIGS. 4a and 4b.

Figure 5:
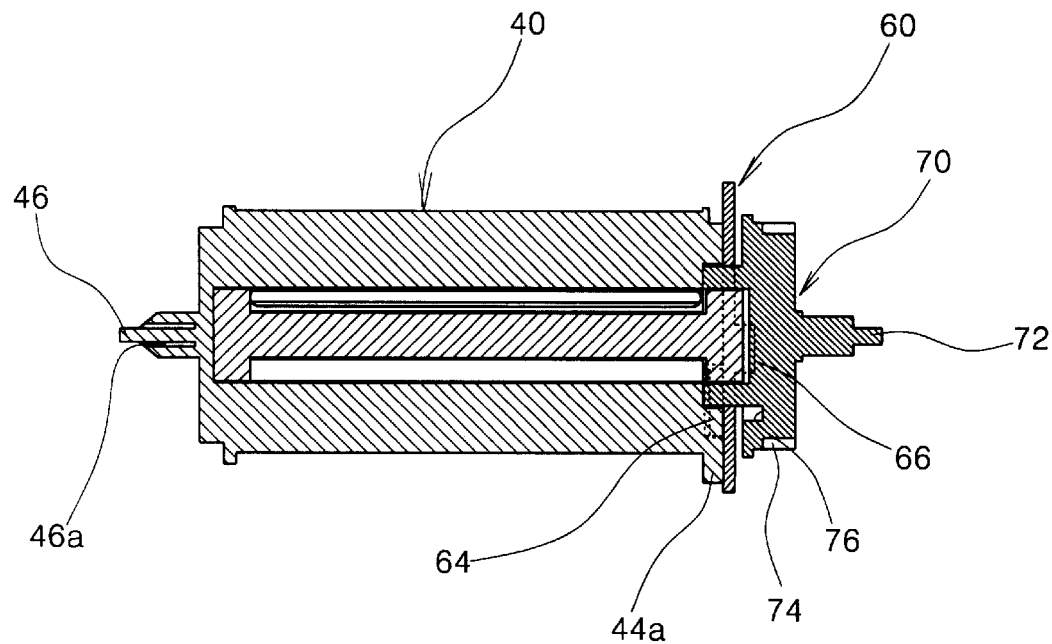
FIG. 5 is a side cross-sectional view illustrating the safety belt retractor assembled with the skid mechanism according to the invention.

The skid mechanism is assembled after the torsion bar 50 is inserted into the receptacle groove 42 and coupled at one end to the sealed end of the belt winding shaft 40. As shown in FIG. 5, the skid member 60 is seated on the cylindrical projection portion 44 in a manner that the latching element 64 is placed adjacent to the stopper 44a at the initial position. Then, the skid structure 70 is coupled to the belt winding shaft 40, in a manner that the coupling portion 78 of the boss 75 is coupled with the other end 54 of the torsion bar 50, and the projector 66 of the skid member 60 is inserted into the guide groove 76 to be moved therein from the initial position or one position of the guide groove 72 shown in FIG. 4a toward the stopping position or the other position of the guide groove 72 shown in FIG. 4b. Therefore, the skid mechanism is constructed as a part of a safety belt retractor to be operable against the forced rotation of the belt winding shaft.

When a vehicle collides with another vehicle or its speed is rapidly decreased due to the impact with another object, the sprocket 74 becomes locked in engagement with a belt winding shaft housing to stop its further rotation, in a manner that it is coupled with a locking device cooperated with the vehicle sensor or the web sensor. At that time, a high force is applied to a web so as to restrain the belted occupant in the vehicle. The sudden generated loading forces the skid member 60 of the skid mechanism to be first rotated along with the belt winding shaft 40, while the projector 66 is moved in the guide groove 76. But, the movement of the projector 66 is blocked at least one time by paired blocked elements 77 until the latching element 64 is contacted with the stopper 44a as shown in FIGS. 4a and 4b, during which time the excessive force applied to the web is dissipated. Until the latching member 64 reaches the stopper 44a, matching up with the further rotation of the belt winding shaft 40, the torsion bar 50 is twisted by an amount of its twisting property to reduce the web loading, thereby relieving the pressed feeling of the belted occupant. Thereafter, when the web loading is removed, the belt winding shaft 40 is again returned to the original state, while it forces the skid member 60 to be reversely rotated with its other surface being contacted with the stopper 44a, so that the latching element 64 is returned to the initial position. Herein, it is noted that the skid member 60 can be repeatedly operated every time that the excessive web loading occurs.

As described above, according to the invention, a skid mechanism is easily coupled to a belt winding shaft, in which the skid mechanism comprises a skid member and a skid structure coupled with each other to increase the rotational amount of the belt winding shaft and control the dissipating amount of the web loading or enlarge the restraining force limit range of the web loading, so that upon the vehicle impact it can give a flexibility to a force applied to a belted occupant.

What is claimed is:

1. A safety belt retractor including a belt winding shaft and a torsion bar accommodated in the belt winding shaft, said torsion bar coupled at one end thereof to an end surface of the belt winding shaft and at an other end thereof to a locking device, further comprising:

the belt winding shaft including a flange extended from around a periphery thereof and a cylindrical projecting portion projected from an other end of the belt winding shaft to be coupled to a skid mechanism and including a stopper projected from one side thereof to determine a rotation of the torsion bar; and the skid mechanism including a skid member seated on the cylindrical projecting portion and a skid structure coupled with the other end of the torsion bar together with the skid member to limit rotation of the belt winding shaft, in which the skid member includes a latching portion contacting with the stopper of the cylindrical projecting portion to be cooperated therewith, and a projector extruded from a portion adjacent to an aperture formed in a center thereof to limit rotational twisting movement of the torsion bar.

2. The safety belt retractor as claimed in claim 1, in which:

the latching portion includes a step portion that guides rotation of the skid member in contact with the one side of the cylindrical projecting portion and an upper surface of the flange.

3. The safety belt retractor as claimed in claim 1, in which:

the skid structure includes a sprocket integrated therewith, a boss formed to enable the other end of the torsion bar to be inserted thereinto and a guide groove formed around a periphery of the boss on a bottom surface thereof for guiding rotational movement of a projector.

4. The safety belt retractor as claimed in claim 3, in which:

the skid structure includes at least two blocking elements provided in the guide groove thereof.

5. The safety belt retractor as claimed in claim 1, in which:

the skid structure includes at least two blocking elements provided in a guide groove thereof.

* * * * *